United States Patent [19]

Malavasi

[11] Patent Number: 4,967,282
[45] Date of Patent: Oct. 30, 1990

[54] WEARABLE DEVICE FOR THE SUPPORT OF A PORTABLE TELECAMERA

[76] Inventor: Enzo Malavasi, Via Calatafimi, 15, Varese, Italy

[21] Appl. No.: 407,526

[22] Filed: Sep. 15, 1989

[30] Foreign Application Priority Data

Jan. 13, 1989 [IT] Italy .............................. 60901/89[U]

[51] Int. Cl.$^5$ .................... H04N 5/30; A45F 3/08; G03B 29/00; G03B 17/00
[52] U.S. Cl. .................................. 358/229; 224/908; 224/262; 354/82; 354/293; 352/243; 358/222
[58] Field of Search .................. 358/229, 906, 222; 224/908, 262, 222, 201, 261; 354/94, 293, 81, 82; 352/243

[56] References Cited

U.S. PATENT DOCUMENTS

| | | | |
|---|---|---|---|
| 3,882,524 | 5/1975 | Rauscher | 354/293 |
| 4,037,763 | 7/1977 | Turchen | 224/908 |
| 4,158,490 | 6/1979 | Gottschalk et al. | 224/908 |
| 4,206,983 | 6/1980 | Nettman et al. | 354/293 |

*Primary Examiner*—James J. Groody
*Assistant Examiner*—Safet Metjahic
*Attorney, Agent, or Firm*—Bucknam and Archer

[57] ABSTRACT

The device comprises three parts, the first part being constituted by a rigid frame of rectangular shape with means for support and flexible elements to be attached to the body of the operator and a rigid element adapted to support the second part. The second part comprises three structures of which: (1) the first structure consists essentially of a longitudinal rigid element (11) connected at one end to the rigid support element (10) of the first part by coupling means which permit freedom of rotation according to a vertical axis; (2) the second structure consists of a rigid elongated box (12) connected to the other end of said first element (11) by coupling means with freedom of rotation around a vertical axis; and (3) the third structure consists of a lever (13) which has its fulcrum in the second structure by means of coupling means with freedom of rotation around a horizontal axis. This third structure is provided at one end with suspension elements for suspending the third part, and at the other end with balancing elements (38, 38'). The third part consists of: (1) a longitudinal rigid element (44); (2) means for fixing the telecamera in the upper part; and (3) supporting means for the longitudinal element. A suspension of cardanic joint tipe of the third part is achieved. The device also comprises at least one counterweight.

6 Claims, 2 Drawing Sheets

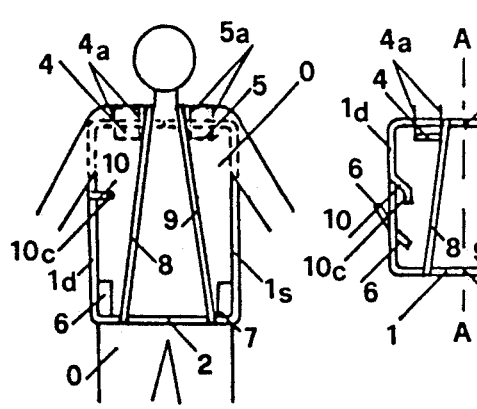
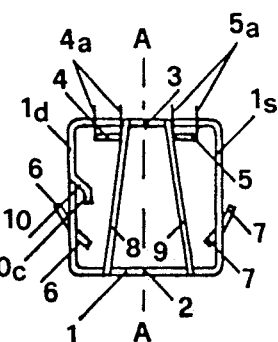
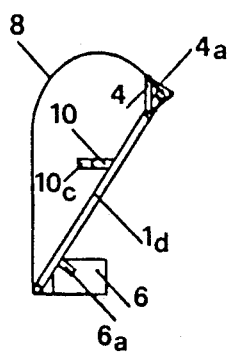
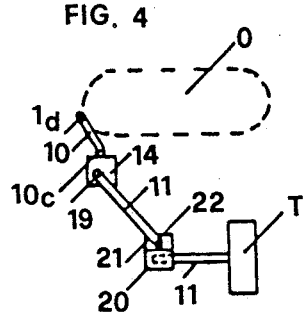
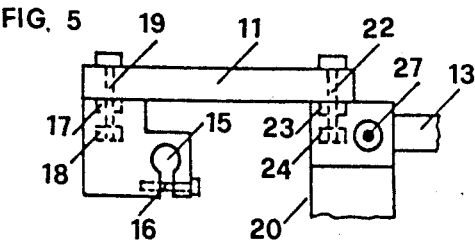
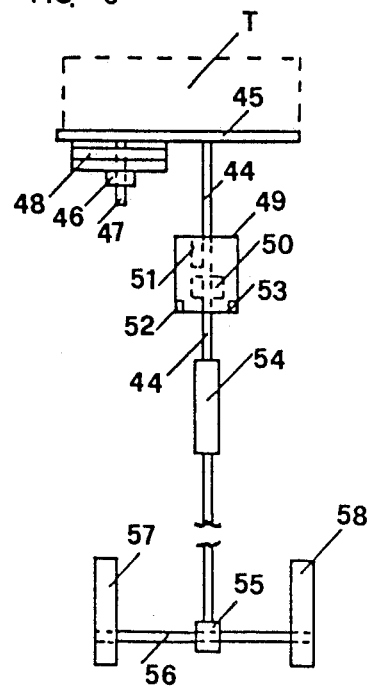

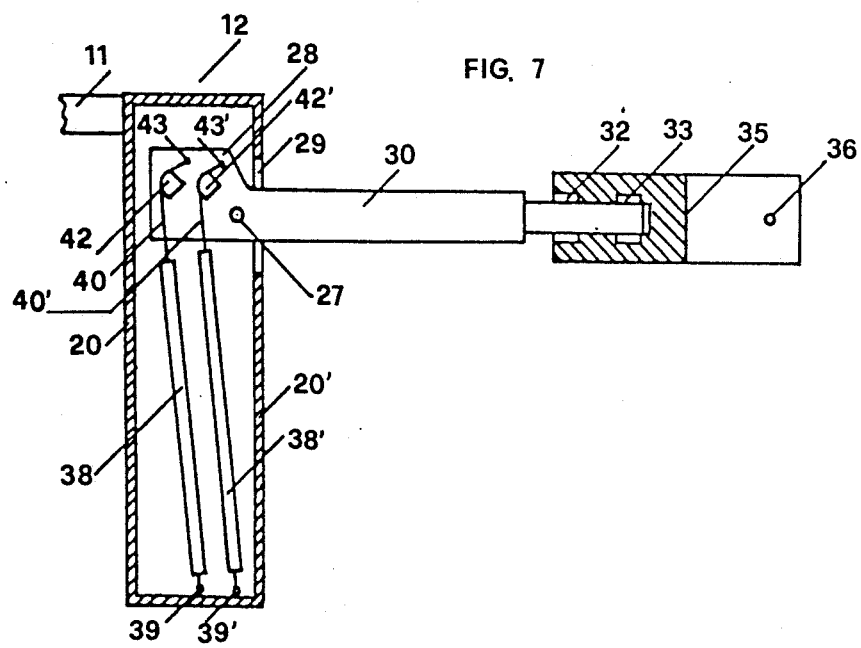
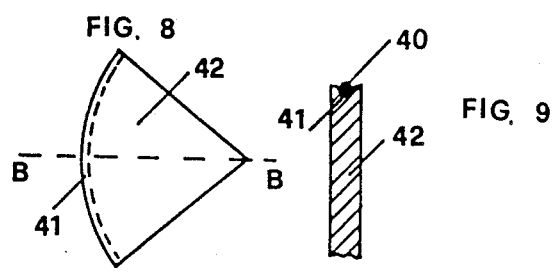
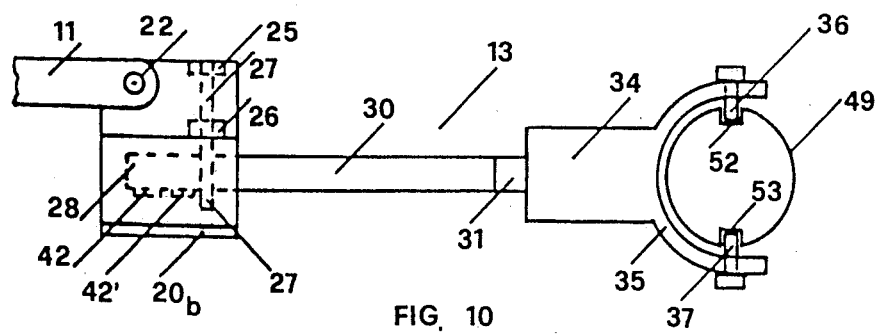

WEARABLE DEVICE FOR THE SUPPORT OF A PORTABLE TELECAMERA

The present invention relates to a device to be worn by an individual for supporting a portable telecamera. More specifically, the present invention relates to a device for supporting a telecamera for an amateur or a semi-professional individual. There are known devices for supporting portable telecameras for professional use which may be found on the market at very high price in the order of magnitude of 80-100 million lire. The object of these devices is to be able to fix the telecamera to a structure which may be connected to the body of the operator in such a way that the operator may move in a variety of manners and may easily maintain the telecamera always in the same position with respect to the around, rather than with respect to the operator and also so that the telecamera is not displaced during motions by the operator which may be more or less sudden, but in a manner extremely mild so that the television pick-up is not affected at all by these motions of the operator, but the result is always as if the telecamera has remained constantly fixed or has moved essentially with a uniform motion.

The use of the telecamera has had a great development also for amateurs because of the great practicality of the television pick-up with respect to the cinematographic pick-up. The reason is that the telecamera operates directly with a video recorder cassette which immediately after the pick-up may be extracted from the telecamera and may be introduced in a video recorder for the immediate viewing with any televisor.

With the development of telecamera for amateurs and semi-professional people, the necessity of being able to use devices analogous ;o the devices used by professional people has immediately arisen and specifically devices capable of being suspended from the body of the operator. These devices practically do not exist yet because the devices used by professional people due to the great cost due to the complexity of their structure are not in the price range that an amateur could afford to buy.

An object of the present invention is to provide for this lack of structure and specifically to provide a device of simple conception and simple construction and yet of relatively low cost, but at the same time, of sufficient practicality so that an amateur may keep the telecamera without great effort with respect to the size and attention involved in the desired position independently from his motions or that he may displace it with very mild motions so that the pick up is not affected in quality due to eventual interruptions or sudden motions of the operator.

The device according to the present invention for supporting a portable telecamera which may be worn by the operator consists of at least three members of which:

The first member consists of a rigid structure, in general a frame of rectangular shape of dimensions to be adjusted depending upon the size of the operator, the frame being provided with support elements and flexible elements of support to be attached to the body of the operator and further provided with a rigid element for supporting the second member;

The second member comprises three structures of which:

The first structure consists essentially of a rigid longitudinal element connected at one end to the rigid element of support which is part of the first member had means of a suitable coupling with freedom of rotation around an axis which is essentially parallel to the longitudinal axis of the body of the operator, which, being normally vertical, will be referred hereinbelow as the vertical structure;

The second structure consists of a rigid structure in general in the shape of an elongated box connected at the other end of the first structure by means of a suitable coupling with freedom of rotation on a vertical axis;

The third structure consists of a lever which has the second structure as the fulcrum and which is connected to it by means of a suitable coupling with freedom of rotation around an horizontal axis. This third structure is provided at one end with suspension elements for the third member and is provided at the other end with balancing elements acting in general between the third and second structure capable of balancing the same lever after the third member has been suspended from the other end independently from its inclination.

The third member consists of:

a longitudinal rigid structure, a structure for fixing the telecamera firmly in the upper part of the above-mentioned longitudinal structure, an element of support of the longitudinal structure connected to it so as to permit the free rotation of the same structure with respect to its vertical axis and capable of cooperating with the suspensions elements of the third structure of the second member to achieve a suspension having a cardanic joint of the third member. This third supporting structure comprises also a braking element capable of maintaining the relative orientation of the longitudinal structure, and therefore, of the telecamer with respect to the operator and capable of deadening the motions of rotation of this longitudinal structure around its vertical axis, the motions of rotation being carried out manually by the operator;

one or more counter-weights capable of maintaining the verticality of the longitudinal structure or better the horizontality of the telecamera after the latter has been fixed on the longitudinal structure and the longitudinal structure has been suspended on the suspension elements of the third structure of the second member.

According to one preferred embodiment of the invention, the structure for fixing the telecamera is provided with ballast elements different from the devices and elements for fixing this ballast elements in such a manner that if one changes the telecamera and if of one uses a telecamera of weight different from the determined weight in order to establish the overall weight of the third member, of the basis of which the balancing elements of the third structure of the second member are proportioned, the weight of the third member may be kept constant by increasing or decreasing the ballist elements fixed to the same in relation to the smaller or greater weight of the new telecamera.

According to another embodiment, the balancing elements of the third structure of the second member consists of a spring connected at one end to a fixed point of the second structure and at the other end to a fixed point of the third structure by means of a linear flexible element located on the periphery of a curved guide fixed to the third structure, while the position and the shape of the third guide are determined in such a manner that when the inclination of the lever varies, the lever conforming the third structure and therefore the bending moment of the weight of the third member with respect to the horizontal axis of rotation of the same lever, the balancing moment of the bending moment which is constituted by the tension of the spring along its arm with respect to the same axis, both elements being variable with the variation of the inclination of the third structure, remains the same or at least very close to the value of the corresponding bending moment to counterbalance.

According to an embodiment similar to the preceding one, the curved guide around which the flexible structure is connected, the flexible structure connecting the extremity of the balancing spring, is constituted simply by a circular sector positioned on the opposite part of the longitudinal axis of the third structure of the second member and goes through the horizontal axis of rotation of the same with respect to the point of connection of the spring to the second structure and if the lever is of the first type on the opposite part and if the lever is of the second type on the same part of the axis perpendicular to the same longitudinal axis in the point of incidence with the horizontal axis of rotation with respect to the end provided with suspension elements of the third member and turned with the convexity on the part opposite to the perpendicular axis, the radius of this sector and its position being determined experimentally only on the basis of the abovementioned parameters and on the basis of a practical checking of the results in relation to the degree of acceptability of the same, that is, on the basis of the difference between the balancing moment and the bending moment to by balanced to the variation of the inclination of the third structure of the second member in such a manner that these differences a.e sufficiently small so that the operator may raise or lower the telecamera or may maintain the telecamera still while he carries out sudden motions and may avoid that the relative motion of the telecamera be such as to negatively affect the quality of the television pick-up.

According to an improvement of the two embodiments discussed hereinabove, the balancing elements of the third structure of the second member comprise two or more springs and each spring is constrained at one end in fixed manner to the second structure of the second member and is provided at the other end with a linear flexible element which opens on the periphery of a suitable curved guide, and therefore becomes fixed to the third structure of the second member because each guide is positioned and shaped as described hereinabove according to the first two embodiments.

A further improvement of the embodiments described hereinabove reside in the use of a counterweight of which the third member is provided, which counterweight consists of two substantial masses of essentially equal amount and shape mounted eccentrically in ar adjustable manner both angularly and linearly along a shaft which is connected to the lower end of the longitudinal structure of the third member perpendicularly and linearly in a regulatable manner so that the two masses may act not only as counterweights modifying their position on the basis of the aforementioned possible adjustments, but also as inertia elements against the rotation of the same longitudinal structure around its vertical axis.

For the purpose of better clarifying the invention the following embodiment will be described by way of example with reference to the drawings of which:

FIG. 1 is a front elevational view;

FIGS. 2 and 4 are planar views;

FIG. 3 is a cross-section of FIG. 2 along the line A—A;

FIG. 5 is a front elevational view;

FIG. 6 is an elevational view with some parts in cross-section;

FIG. 7 is a side elevational view with some parts in cross-section;

FIG. 8 is a side elevantional view of a detail of FIG. 7;

FIG. 9 is a view of FIG. 8 along line B—B;

FIG. 10 is a planar view.

The device may be worn for supporting a portable telecamera of the weight of about 3 kg. The device comprises three members. The first member consists of a metallic tubular frame 1 of essentially rectangular shape consisting of two halves, one right, 1-d, and one left, 1-s, which are connected between themselves with a bayonet-type joint in the central lower part 2 and in the upper central part 3 in such a manner as to adjust the frame in width corresponding to the size of the operator designated by the symbol O. This frame is inserted normally from above on the body of the operator because two plates 4 and 5 adhere to the shoulders of the operator, the plates being constrained with the square 4a and 5a to the upper side of the frame. To the sides of the frame are fixed by means of the squares, 6a and 7a, the two curved plates 6 and 7 which are capable of adhering to the sides of the operator while the belts 8 and 9 fixed to the upper and lower part of the frame and permit to suspend the frame to the body of the operator.

Frame 1 is provided on the right side of the operator with a rigid extension 10 which is oriented in such a manner that when the frame is worn by the operator, it results to be in the horizontal position and serves to support the remainder of the device with the telecamera T. The surfaces of the plates 5, 6, 7 and 8 which come in contact of the body of the operator are covered with a layer of soft rubber for the purpose of providing comfort to the individual.

The second member consists of three structures, that is, of a bar 11 of rectangular section, a structure in the shape of a box 12, and a lever 13. While the lever 13 is connected permanently to the structure 12 and the latter to the bar 11, the latter is fixed only during the act of use of the telecamera, that is, after the operator has worn the frame, to the rigid support 10 of the frame 1 by means of element 14. This element 14 is provided with an open orifice 15 capable of holding the terminal cylindrical part 10c of support 10 and capable of being blocked to the latter by means of screw 16 while the upper part of element 14 is capable of providing a seat for the two spherical bearings 7 and 18 for constituting a hinge around the vertical axis of the bar 11 by means of pin 19.

The structure in the shape of box 12 as shown in FIG. 7 consists of a box 20 of parallelepipedal shape provided laterally with a parallelepipdal protrusion to which is hinged the second extremity of bar 11 by means of pin 22 which is received with a free rotation in two spherical bearings 23 and 24 seated in the same protrusion. Further, in this same protrusion are seated in a direction perpendicular to the preceding bearings the spherical bearings 25 and 26, which support with a free rotation according to a horizontal axis the shaft 27 on which is fixed the lever 13.

The extremity 28 of this lever remains in the interior of the box 20 and of the opposite side of the shaft 27, the lever comes out from the box through slit 29 which is formed on the wall 20a of the box the central part of the box consisting of a bar of rectangular section 30 which ends with a cylindrical part 31 connected with free rotation by means of bearings 32 and 33 to the hollow sleeve 3 connected to the fork 35 to the ends of which are placed two pins 36 and 37.

The elements which balance the lever 13 consist of a pair of springs 38 and 38' the lower ends of which are fixed by means of screws 39 and 39' to the box 20 while the other ends are connected to flexible cables 40 and 40' which enter in the parallel throat 41, 41' of the two circular sectors 42 and 42' connected to the end 28 of the lever 13 and become fixed to this end 28 by means of screws 43, 43'.

Box 20 is provided with one long wall which is dismountable and which serves as a cover 20b.

The third member of the device consists of a cylindrical tube 44 to which is connected in the upper part plate 45 capable of receiving the telecamera T by means of an element which may be screwed onto the telecamera and which may be blocked on the plate 45 with a suitable pin, means which are not shown in FIG. 6 because they are well-known in the art.

This plate 45 has in the lower part a pin 46 with a nut 47 capable of receiving and fixing to the plate the disks 48 which serve as a ballast of which the device is provided. In this manner the third member always weighs 7 kg. no matter what is the type of the telecamera used by the amateur which, in general, has a weight in the range between 3 and 4.5 kg. The cylindrical tube 4 of the third member goes through the substantially cylindrical element 49 which supports the tube 44 by means of the ax al bearing 50 which permits the free rotation of the tube 44 with respect to the cylinder 49. The magnet 51 is seated in the cylinder 49 and serves the purpose of deadening sudden rotations of the telecamera, and therefore of the tube 44 with respect to the cylinder 49. The latter in addition is provided with two external diametrical notches 52 and 53 which are capable of engaging with the pins 36 and 37 of the external extremity of the liver 13 so that a support of the type of the cardanic joint of the third member of the device is achieved. This is because the two axes of rotation of the joint are constituted one by the axis of the pins 36 and 37 and the other by the longitudinal axis of rotation of the sleeve 34 with respect to the terminal cylindrical part of the lever 13. Underneath the cylinder 49, the tube 44 is provided with a cylindrical hand grip 54 and at the lower end of tube 44 is connected by means of an adjustable joint 55 a transversal shaft 55. As shown in FIG. 6 the two counterweight disks 57 and 58 are connected eccentrically to the ends of the shaft by means of joints which permit both the angular adjustment of the two disks 57 and 58 with respect to their eccentric axes as well as their displacement along the same shaft 56 in such a manner that depending upon the telecamera and the balancing disks or other eventual accessories it is possible to balance the third member so that the telecamera remains always in the horizontal position. This is due to the fact that the disks mentioned hereinabove also function as rotary stabilizers of inertia against the rotations of the third member around its vertical axis and therefore permit the stabilize at the most the position of the telecamera and ensure on the other hand always a mild displacement of the telecamera.

It should be noted that details of the various couplings are not discussed in the description hereinabove and are not shown in the drawings because they are well-known in the art and because the couplings are made in such a manner as to reduce as much as possible the friction so that the operator may displace the telecamera in a manner as mild as possible, that is, without sudden motions.

FUNCTIONING OF THE DEVICE

The operator wears the first member of the device by sliding the frame from above on the upper part of the body and suspending the frame on the shoulders by means of suspenders 9 and 10. Then the operator fixes on the extension 10 of the frame 1 by means of element 14, the second member of the device. Then after having fixed the telecamera on the plate 45 of the third member, he places the latter on the external extremity of the lever 13 by causing the pins 36 and 37 of this end to enter in the notches 52 and 53 of the cylinder 49 of the third member. Then he proceeds to regulate eventually the angular position of the two counterweights 57 and 58 so that the telecamera is in the horizontal position. It is clear that the simple device according to the present invention permits the operator to maintain the telecamera in the desired position with great ease by grasping the cylindrical handgrip 54 of the third member. The bar 11 and the box 2 rotate with respect to the support 10 and between themselves, and they permit the operator to maintain the telecamera still with respect to the ground also with lateral displacements or displacements forwardly or rearwardly of the operator, obviously within the limits permitted by the dimensions of the device.

In addition the telecamera may be maintained at the same height also with vertical displacements of the operator who can raise and lower the telecamera by acting without any effort always by means of the handgrip 54 because the lever 13 is always balanced by the action of the springs 38 and 38'.

The practical result of the invertion is noteworthy in spite of the fact that it is achieved without requiring the complicated mathematical calculations to stabilize the shape and the position of the sectors 42 and 42' which serve as a guide for the flexible cables 40, 40' which are connected to the free ends of the springs 38, 38'. In fact even if one utilizes the simplest solution, that is, the solution which provides for the use of a sector of circular shape fixed to the internal extremity of lever 13 above the longitudinal axis of the same, going through the horizontal axis of the rotation of the shaft 27 and going on the side of the extremity 28 with respect to the same shaft 27, it is possible to determine easily the final position of the sectors 42 and 42' merely by one of two adjustments because the practical result is always very satisfactory.

What is claimed is:

1. A device to be worn by an operator for supporting a portable telecamera characterized by the fact that it is constituted by at last a first member, a second member and a third member:
    the first member being constituted by a rigid wearable structure forming a frame of rectangular shape of adjustable dimensions according to the size of the operator provided with means for support and flexible elements to be attached to the body of the operator and a rigid element (10) adapted to support the second member;
    the second member comprising three structures of which:

(1) the first structure consists essentially of a longitudinal rigid element (11) connected at one end to the rigid support element (10) of said first member by coupling means which permit freedom of rotation according to a vertical axis;

(2) the second structure consists of a rigid element generally in the shape of an elongated box (12) connected to the other end of said first element (11) by coupling means with freedom of rotation around a vertical axis;

(3) the third structure consists of a lever (13) which has its fulcrum in said second structure by means of coupling means with freedom of rotation around a horizontal axis, said third structure being provided at one end with suspension elements for suspending the third member, and at the other end with balancing elements (38, 38'), said balancing element acting between the third and the second structure and being capable of balancing said lever independently from its inclination after the third member has been suspended at said ore end;

the third member consisting of:

(1) a longitudinal rigid element (44);

(2) means for fixing the telecamera in the upper part thereof;

(3) supporting means for said longitudinal element connected thereto in a manner capable of permitting the free rotation of said longitudinal element with respect to its vertical axis, and being capable of cooperating with the suspension elements of said third structure of the second member whereby a suspension of cardanic joint tipe of the third member is achieved, said supporting means comprising also a breaking element capable of maintaining the orientation of said longitudinal rigid element (44), capable of maintaining the telecamera oriented with respect to the operator and capable of deadening the motions of rotation of said longitudinal element around its vertical axis, said motions of rotations being manually carried out by the operator;

(4) at least one counterweight capable of maintaining the verticality of said longitudinal rigid element (44) and the horizontality of said telecamera after the latter has been fixed on said rigid longitudinal element and after said rigid longitudinal element has been suspended on the e suspension elements of said third structuread of said second member.

2. The device according to claim 1 characterized by the fact that the means for fixing the telecamera is provided with ballast elements (48) separate from the device and elements for fixing said ballast elements whereby when the telecamera being used is changed and a second telecamera of weight different from the weight previously determined for the purpose of establishing the overall weight of the third member on the basis of which the balancing elements of the third structure of the second member are proportioned, it is possible to keep constant the weight of the third member by increasing or decreasing said ballast element fixed on the device corresponding to the smaller or greater weight of said second telecamera.

3. A device according to claim 1 characterized by the fact that the balancing elements (38, 38') of the third structure of the second member consists of a spring connected at one end to a fixed point of the second structure, and at the other end to a fixed point of the third structure by means of a flexible linear element (40, 40') which comes in contact with the periphery of a curved guide (42, 42') connected with said third structure, the position and the shape of said guide being so determined that when the inclination of said lever is varied, said lever constituting said third structure of said second member, whereby the bending moment of the weight of the third member with respect to the horizontal axis of rotation of said lever is varied, the balancing moment of said bending moment constituted by the tension of the spring due to the arm thereof with respect to said horizontal axis, both said elements being variable with variation of the inclination of said third structure, remains always the same or approximately the same as the value of the corresponding bending moment being counterbalanced.

4. The device according to claim 3 characterized by the fact that the curved guide around which the flexible element which connects one end of the balancing spring goes, consists of a circular sector positioned on the opposite portion of the longitudinal axis of the third structure of said second member, said circular sector going through the horizontal axis of rotation of said second member with respect to the point at which said spring is attached to the second structure and on the opposite side when said lever is of the first type and on the same side if the lever is of the second type, of the axis perpendicular to said longitudinal axis in the point of incidence with the axis of horizontal rotation with respect to the extremity provided with said suspension elements of the third member and turned with the convexity on the side opposite to said perpendicular axis the radius of said sector and the position of said sector being experimentally determined only on the basis of said parameters and on the basis of a practical determination of the results in relation to the degree of acceptability of same, and therefore on the basis of the differences between the balancing moment and the bending moment to be balanced due the variation of inclination of said third structure of said second member whereby said differences are sufficiently small whereby the operator may raise and lower the telecamera or maintain the telecamera still while said operator performs sudden motions without the possibility that the relative motion of the telecamera be such as to affect negatively the quality of the television pick-up.

5. The device according to claim 4 characterized by the fact that the balancing elements of the third structure of said second member comprise two or more springs and each spring is held at one end in a fixed manner to the second structure of said second member and is provided at the other end with a linear flexible element which opens on the periphery of said curved guide and becomes fixed to said third structure of said second member.

6. The device according to claim 1 characterized by the fact that the counterweight of said third member consists of two masses of value and shape essentially equal eccentrically mounted in an adjustable manner both angularly and linearly along a shaft perpendicularly connected and in a manner linearly adjustable to the lower extremity of the longitudinal structure of said third member in such a manner that it is capable of acting as a counterweight modifying their position on the basis of said adjustments and also as inertia elements against the rotation of said longitudinal structure around its vertical axis.

* * * * *